(12) United States Patent
Sanders et al.

(10) Patent No.: US 10,871,471 B1
(45) Date of Patent: Dec. 22, 2020

(54) SYSTEMS AND METHODS FOR INSPECTING ADDITIVELY MANUFACTURED COMPONENTS

(71) Applicant: THE BOEING COMPANY, Chicago, IL (US)

(72) Inventors: Daniel G. Sanders, Cle Elum, WA (US); John R. Hull, Sammamish, WA (US); Gary E. Georgeson, Tacoma, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/732,623

(22) Filed: Jan. 2, 2020

(51) Int. Cl.
*G01N 29/265* (2006.01)
*G01N 29/06* (2006.01)
*B33Y 50/02* (2015.01)
*B33Y 10/00* (2015.01)
*G08B 5/22* (2006.01)
*B33Y 30/00* (2015.01)
*G01N 29/24* (2006.01)

(52) U.S. Cl.
CPC .......... *G01N 29/2412* (2013.01); *B33Y 10/00* (2014.12); *B33Y 30/00* (2014.12); *B33Y 50/02* (2014.12); *G01N 29/0654* (2013.01); *G01N 29/265* (2013.01); *G08B 5/226* (2013.01); *G01N 2291/0231* (2013.01); *G01N 2291/0289* (2013.01); *G01N 2291/26* (2013.01)

(58) Field of Classification Search
CPC .. G08B 5/226; G01N 29/0654; G01N 29/265; G01N 2291/0231; G01N 2291/0289; G01N 2291/26; B33Y 10/00; B33Y 30/00; B33Y 50/02
USPC ......................................................... 73/588
See application file for complete search history.

(56) References Cited

U.S. PATENT DOCUMENTS

| | | | |
|---|---|---|---|
| 4,673,999 A * | 6/1987 | Suyama | G11B 5/3133 360/121 |
| 8,806,950 B2 | 8/2014 | Hull | |
| 9,751,260 B2 | 9/2017 | Dietrich | |
| 10,191,014 B2 * | 1/2019 | Hull | G01N 29/2412 |
| 10,627,370 B2 * | 4/2020 | Cobb | G01N 29/07 |
| 2003/0167137 A1 * | 9/2003 | Ohtani | G01N 29/11 702/35 |
| 2016/0349215 A1 * | 12/2016 | Todorov | G01N 27/9013 |
| 2018/0036964 A1 * | 2/2018 | Dehghanniri | G01N 27/9013 |
| 2018/0193947 A1 * | 7/2018 | Harding | G05B 19/4099 |

* cited by examiner

*Primary Examiner* — Jacques M Saint Surin
(74) *Attorney, Agent, or Firm* — The Small Patent Law Group LLC; Joseph M. Butscher

(57) ABSTRACT

A system and method for inspecting an additively manufactured component include an additive manufacturing head configured to form a component layer-by-layer, and an electromagnetic acoustic transducer (EMAT) configured to inspect one or more layers of the component.

20 Claims, 9 Drawing Sheets

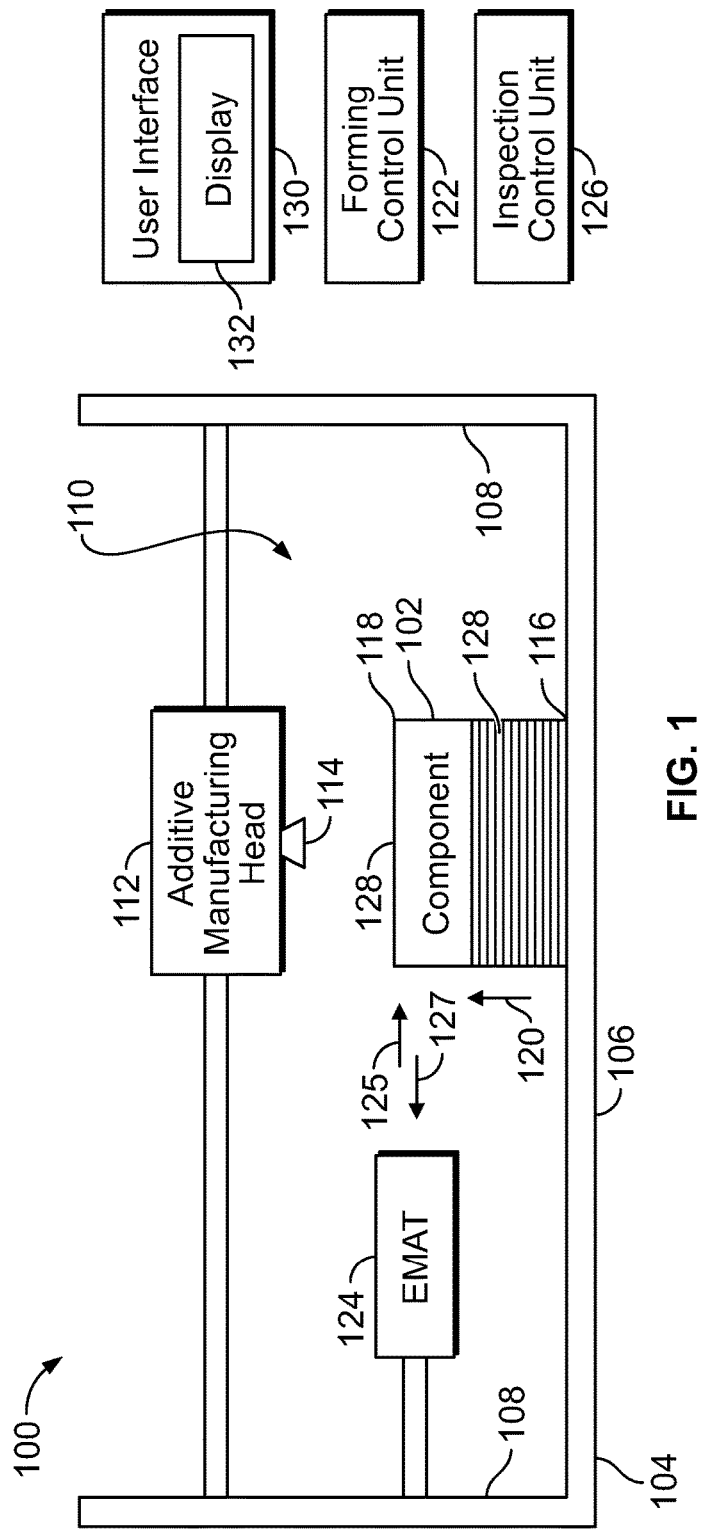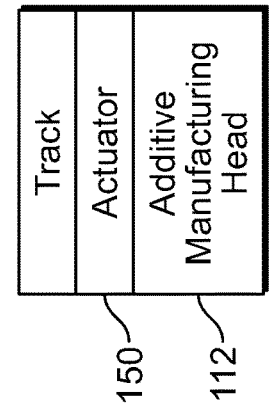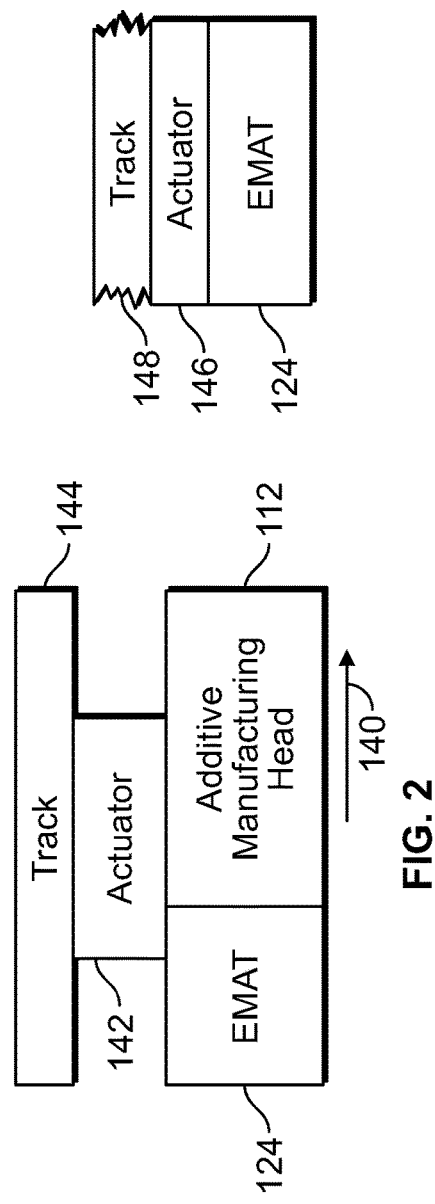
FIG. 1
FIG. 2
FIG. 3

SYSTEMS AND METHODS FOR INSPECTING ADDITIVELY MANUFACTURED COMPONENTS

FIELD OF THE DISCLOSURE

Embodiments of the present disclosure generally relate to additive manufacturing processes and components, and, more particularly, to systems and methods of inspecting additively manufactured components.

BACKGROUND OF THE DISCLOSURE

Additive manufacturing systems and methods are used to fabricate components (such as parts or products) through multiple layers of material. For example, known additive manufacturing systems and methods fabricate a component by adding layer-upon-layer of material. Additive manufacturing systems and methods may include or otherwise use three dimensional (3D) modeling (for example, computer-aided design or CAD) software, computer-controlled additive-manufacturing equipment, and raw materials in powder or liquid form, for example.

Additive manufacturing encompasses a wide variety of technologies and incorporates a wide variety of techniques, such as, for example, laser freeform manufacturing (LFM), laser deposition (LD), direct metal deposition (DMD), laser metal deposition, laser additive manufacturing, laser engineered net shaping (LENS), stereolithography (SLA), selective laser sintering (SLS), fused deposition modeling (FDM), multi jet modeling (MJM), 3D printing, rapid prototyping, direct digital manufacturing, layered manufacturing, and additive fabrication. Moreover, a variety of raw materials may be used in additive manufacturing to create products. Examples of such materials include plastics, metals, concrete, and glass.

One example of an additive-manufacturing system is a laser-based additive-manufacturing system. Laser additive manufacturing includes spraying or otherwise injecting a powder or a liquid into a focused beam of a high-power laser or nexus of a plurality of high-powered lasers under controlled atmospheric conditions, thereby creating a weld pool. The resulting deposits may then be used to build or repair articles for a wide variety of applications. The powder injected into the high-power laser beam may include a wide variety of materials such as metal, plastic, and/or the like.

As a component is formed through additive manufacturing, residual stress may cause anomalies in the component. The residual stress can be measured by using a strain gage and either drilling holes through the component and/or strain gage or electron beam cutting of a line through or near the component and/or the strain gage. However, drilling holes and electron beam cutting typically destroys the test piece. Moreover, strain gages are directly applied to the structure, and often exhibit issues in relation to practicality and sensitivity. In short, certain known methods of detecting anomalies in a component are destructive, in that they typically render the component being monitored unsuitable for further use, and require direct contact, such as by a strain gage.

As an alternative for measuring surface residual stress, X-ray diffraction may be used. However, such systems typically utilize complex and expensive measuring apparatus. Further, such processes are time-consuming. Additionally, to measure sub-surface residual stress, the component is typically chemically milled away in multiple layers, thereby destroying the component.

SUMMARY OF THE DISCLOSURE

A need exists for a cost-effective and efficient non-destructive and non-contact system and method for inspecting an additively manufactured component.

With that need in mind, certain embodiments of the present disclosure provide a system for inspecting an additively manufactured component. The system includes an additive manufacturing head configured to form a component layer-by-layer, and an electromagnetic acoustic transducer (EMAT) configured to inspect one or more layers of the component.

In at least one embodiment, the system includes a container defining a chamber. The additive manufacturing head is configured to form the component within the container. In at least one embodiment, one or both of the additive manufacturing head or the EMAT are within the chamber. In at least one embodiment, one or both of the additive manufacturing head or the EMAT are moveable relative to the chamber.

In at least one example, the EMAT is configured to inspect the one or more layers of the component as the component is formed by the additive manufacturing head. In at least one other example, the EMAT is configured to inspect the one or more layers of the component after the one or more layers are formed by the additive manufacturing head.

In at least one embodiment, the EMAT does not contact the one or more layers of the component.

In at least one embodiment, the system also includes an inspection control unit in communication with the EMAT. The inspection control unit is configured to analyze inspection data regarding the one or more layers to determine existence of one or more anomalies within or between the one or more layers. The inspection data is generated by the EMAT. The inspection control unit is configured to output an alert to a user interface in response to detection of the existence of the one or more anomalies. For example, the alert may include one or both of an image or description of the one or more anomalies.

The EMAT may be coupled to the additive manufacturing head. The EMAT may be separated from the additive manufacturing head. The additive manufacturing head may be moveably coupled to a first support member, and the EMAT may be moveably coupled to a second support member.

Certain embodiments of the present disclosure provide a method for inspecting an additively manufactured component. The method includes forming, by an additive manufacturing head, a component layer-by-layer, and inspecting, by an electromagnetic acoustic transducer (EMAT), one or more layers of the component.

In at least one embodiment, said forming includes forming the component in a chamber of a container.

The method may include disposing one or both of the additive manufacturing head or the EMAT within the chamber, and/or moving one or both of the additive manufacturing head or the EMAT relative to the chamber.

In at least one embodiment, the method further includes generating (by the EMAT) inspection data regarding the one or more layers, analyzing (by an inspection control unit in communication with the EMAT) the inspection data regarding the one or more layers, and determining, through said analyzing, existence of one or more anomalies within or between the one or more layers. The method may also include outputting (by the inspection control unit) an alert to a user interface in response to detection of the existence of the one or more anomalies.

BRIEF DESCRIPTION OF THE DRAWINGS

FIG. 1 illustrates a schematic diagram of an inspection system for an additively manufactured component, according to an embodiment of the present disclosure.

FIG. 2 illustrates a schematic diagram of an electromagnetic acoustic transducer (EMAT) coupled to an additive manufacturing head, according to an embodiment of the present disclosure.

FIG. 3 illustrates a schematic diagram of an EMAT and an additive manufacturing head, according to an embodiment of the present disclosure.

DETAILED DESCRIPTION OF THE DISCLOSURE

Figure 4:
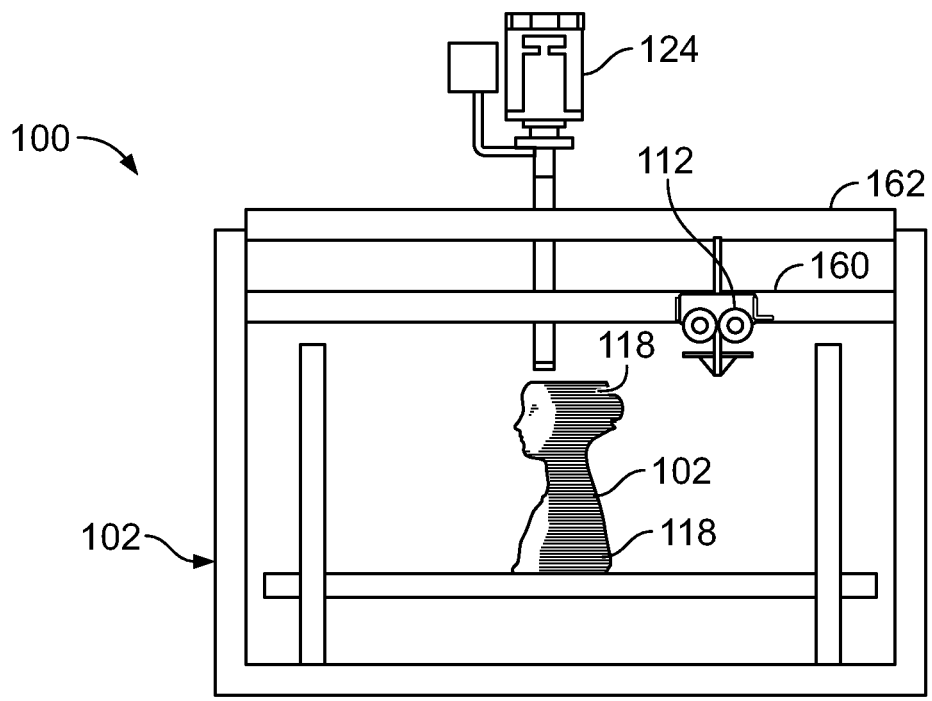
FIG. 4 illustrates a schematic diagram of an inspection system for an additively manufactured component, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide an inspection system for an additively manufactured component that includes a superconducting electromagnetic acoustic transducer used to measure residual stress in the component. The systems and methods can be utilized during manufacturing, as well as servicing and maintenance. Residual stress measurement is used to assess compressive residual stress that is imparted to aerospace hardware by using processes such as shot peening, laser shock peening, water cavitation peening, and the like.

In at least one embodiment, an electromagnetic acoustic transducer (EMAT), such as a super-conductive EMAT, scans above a surface of a layer of an additively manufactured component, thereby creating an image of the residual stress of that layer or set of layers that is used to assess the quality of the layer(s). As such, the EMAT is used to monitor a manufacturing and/or repair process for a component. In at least one embodiment, the EMAT is attached to an end effector of the an additive manufacturing apparatus, such as an additive manufacturing head, so that the EMAT follows behind the end effector during a forming process, and collects a high sensitivity acoustic signal, thereby allowing an image of the signal (amplitude, time of flight, frequency response) to be created. The acoustic signal received by the EMAT varies based upon the residual stress of the added material created during an additive manufacturing process. Resulting images of recently-applied layers are analyzed for out-of-tolerance conditions, particularly residual stress, as well as cracks and lack of fusion or knit lines. In at least one embodiment, inspection data acquired by the EMAT can also be automatically compared against data from a set of identical layers from a reference part or digital data set representing the part.

Embodiments of the present disclosure provide systems and methods that use a superconducting electromagnetic acoustic transducer (SC EMAT) to inspect additively manufactured components. In at least one embodiment, a method for non-destructive inspection of an additively manufactured component includes coupling a superconducting electromagnetic acoustic transducer (SC EMAT) to an additive manufacturing head, scanning each added layer of material using an electromagnetic acoustic signal, creating an image of a residual stress of the laid layer, representing the reflected acoustic signal amplitude, time of flight and frequency, comparing the image to a reference image, analyzing the image, detecting any out-of-tolerance anomaly, deciding to continue the AM manufacturing process, repeat, or repair the laid layer, and storing the collected images for future reference during operational life of the additively manufactured component.

Certain embodiments of the present disclosure provide a system for inspecting an additively manufactured component. The system includes an additive manufacturing head configured to form a component layer-by-layer, and an electromagnetic acoustic transducer (EMAT) configured to inspect one or more layers of the component.

Certain embodiments of the present disclosure provide a method for inspecting an additively manufactured component. The method includes forming, by an additive manufactured head, a component layer-by-layer, and inspecting, by an EMAT, one or more layers of the component.

FIG. 1 illustrates a schematic diagram of an inspection system 100 for an additively manufactured component 102, according to an embodiment of the present disclosure. The inspection system 100 includes a container 104 that includes a base 106 and walls 108 upstanding from the base 106. The base 106 and the walls 108 define a chamber 110.

An additive manufacturing head 112 is fixed in position or moveable in relation to the chamber 110. The additive manufacturing head 112 includes an emitter 114. In at least one embodiment, the emitter 114 outputs ink or other such media. For example, the additive manufacturing head 112 can be part of a 3D printer that forms the component 102. As another example, the emitter 114 outputs energy (such as laser energy) into a powder bed to form a component. The additive manufacturing head 112 is part of an additive manufacturing forming system that is configured to form the component 102, layer-by-layer, such as through laser freeform manufacturing (LFM), laser deposition (LD), direct metal deposition (DMD), laser metal deposition, laser additive manufacturing, laser engineered net shaping (LENS), stereolithography (SLA), selective laser sintering (SLS), fused deposition modeling (FDM), multi jet modeling (MJM), 3D printing, rapid prototyping, direct digital manufacturing, layered manufacturing, additive fabrication, and/ or the like.

The additive manufacturing head 112 forms the component 102, layer-by-layer, such as from a base surface 116 towards an upper surface 118 in a build direction 120. As shown, the build direction 120 may be a vertical direction that extends upwardly from the base 106 within the chamber 110. In at least one embodiment, the additive manufacturing head 112 is a laser scanner that emits energy as one or more laser beams through the emitter 114, which may be a laser output, array, and/or the like. Optionally, the additive manufacturing head 112 may be an electron beam scanner that emits one or more electron beams through the emitter 114, which may be an electron beam output, array, and/or the like. As another example, the additive manufacturing head 112 may be an arcing scanner that emits electrical arcing energy through the emitter 114, which may be an arcing output, array, and/or the like. As another example, the additive manufacturing head 112 may be, or be part of, a 3D printer. U.S. Pat. No. 9,751,260, entitled "Additive Manufacturing Systems, Apparatuses, and Methods" discloses examples of an additive manufacturing head.

In at least one embodiment, the additive manufacturing head 112 is in communication with a forming control unit 122, such as through one or more wired or wireless connections. The forming control unit 122 is configured to control (for example, operate) the additive manufacturing head 112 to form the component 102. The forming control unit 122 may be configured to operate the additive manufacturing head 112 through preprogrammed instructions stored in memory.

An electromagnetic acoustic transducer (EMAT) 124 is configured to inspect the component 102 during or after the manufacturing process. In at least one embodiment, the EMAT 124 is within the chamber 110. For example, the EMAT 124 is fixed and/or moveably secured within the chamber 110. The EMAT 124 outputs an acoustic signal 125 into the component 102. The EMAT 124 receives a reflected acoustic signal 127 from the component 102. The acoustic signal received by the EMAT 124 (that is, the reflected acoustic signal 127) varies based upon residual stress of material within the component 102, such as that of added material created during an additive manufacturing process. The reflected acoustic signal 127 received by the EMAT 124 generates inspection data regarding the component 102.

The EMAT 124 emits the acoustic signal 125 and receives the reflected acoustic signal 127 without contacting the component 102. As such, the EMAT 124 inspects the component 102 in a non-contact, non-destructive manner. Examples of the EMAT 124 are describes in U.S. Pat. No. 8,806,950, entitled "Electromagnetic Acoustic Transducer System," which is hereby incorporated by reference in its entirety.

The EMAT 124 is in communication with an inspection control unit 126, which controls operation of the EMAT 124, and analyzes inspection data (such as data indicative of the reflected acoustic signal 127) received from the EMAT 124. The EMAT 124 is communicatively coupled to the inspection control unit 126, such as through one or more wired or wireless connections. The inspection control unit 126 may be configured to operate the EMAT 124 through preprogrammed instructions stored in memory.

In at least one embodiment, the inspection control unit 126 is also in communication with a user interface 130, such as through one or more wired or wireless connections. The user interface 130 includes a display 132, such as a monitor, screen, or the like. In at least one embodiment, the user interface 130 is a computer workstation. In at least one embodiment, the user interface 130 is a handheld device, such as a smart phone or tablet.

In at least one embodiment, the inspection control unit 126 is configured to display images of the component 102 on the display 132. The images may be formed through analysis of the inspection data received from the EMAT 124.

In operation, the additive manufacturing head 112 forms layers 128 of the component 102, thereby forming the component 102 from the base surface 116 to the upper surface 118 in a layer-by-layer manner in the build direction 120. For example, the additive manufacturing head 112 selectively laser sinters the layers 128 from material within a powder bed onto previously-formed existing layers 128.

During or after the forming process, the EMAT 124 emits the acoustic signals 125 into the component 102, such as into each layer 128 as (and/or after) each layer 128 is formed. The EMAT 124 receives the reflected acoustic signals 127 from the component 102. The inspection control unit 126 analyzes the reflected acoustic signals 127 to determine anomalies (such as cracks, stresses, voids, or the like) in the layers 128. The inspection control unit 126 analyzes inspection data, which includes information regarding the reflected acoustic signals, to determine locations of anomalies within the layers 128 of the component 102. In at least one embodiment, the inspection control unit 126 forms images of the layers 128 of the component 102 based on the inspection data. The images may be shown on the display 132 of the user interface 130.

In at least one embodiment, the EMAT 124 is configured to inspect the component 102 (such as by emitting the acoustic signals 125 and receiving the reflected acoustic signals 127) as the component 102 is being formed layer-by-layer. Alternatively, the EMAT 124 can inspect the component 102 after the component 102 has been fully formed.

The EMAT 124 can inspect the component 102 from a side. As another example, the EMAT 124 can be positioned above or below the component 102. The EMAT 124 inspects the component 102, thereby allowing the inspection control unit 126 to form an image of residual stress of each layer 128 or set of layers 128 as or after the layers 128 are formed.

In at least one embodiment, the EMAT 124 is attached to the additive manufacturing head 112 so that the EMAT 124 follows behind the additive manufacturing head 112 as the layers 128 of the component 102 are formed. The EMAT 124 receives the reflected acoustic signals 127 from the layers 128, thereby allowing the inspection control unit 126 to create images related to the received reflected acoustic signal 127 (indicative of amplitude, time of flight, frequency response, and/or the like). The reflected acoustic signals 127 received by the EMAT 124 vary based upon the residual stress of the added material created during an additive manufacturing process. Resulting images of recently-applied layers 128 are analyzed by the inspection control unit 126 for anomalies, such as out-of-tolerance conditions, particularly residual stress, as well as cracks and lack of fusion or knit lines. In at least one embodiment, inspection data acquired by the EMAT 124 can also be automatically compared against data from a set of identical layers from a reference part or digital data set representing the part. If acceptable data is received, the forming process of the component 102 continues until the component 102 is completed. If, however, out-of-tolerance data is found in a layer 128 of the component 102, the inspection control unit 126 outputs an alert to the user interface 130. In at least one embodiment, a model of the layer(s) 118 having anomalies is automatically run to predict the effect of the anomalies on performance and/or an operator stops the process, assesses the defects and makes a determination regarding a repair.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the forming control unit 122 and the inspection control unit 126 can be or include one or more processors that are configured to control operation thereof, as described herein.

The forming control unit 122 and the inspection control unit 126 are configured to execute a set of instructions that are stored in one or more data storage units or elements (such as one or more memories), in order to process data. For example, the forming control unit 122 and the inspection control unit 126 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the forming control unit 122 and the inspection control unit 126 as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of embodiments herein can illustrate one or more control or processing units, such as the forming control unit 122 and the inspection control unit 126. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the forming control unit 122 and the inspection control unit 126 can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

FIG. 2 illustrates a schematic diagram of the EMAT 124 coupled to the additive manufacturing head 112, according to an embodiment of the present disclosure. As shown, in at least one embodiment, the EMAT 124 is directly coupled to the additive manufacturing head 112. For example, the EMAT 124 can be secured to the additive manufacturing head 112 through fasteners, adhesives, and/or the like. As another example, the EMAT 124 can be integrally formed with the additive manufacturing head 112. As another example, the EMAT 124 can be coupled to, and spaced apart from, the additive manufacturing head 112 by a coupling link, such one or more of a beam(s), bracket(s), housing, and/or the like.

In at least one embodiment, the EMAT 124 follows the additive manufacturing head 112 in a direction of travel 140. Accordingly, the additive manufacturing head 112 forms the layers 128 of the component 102 (shown in FIG. 1) in the direction of travel, and the EMAT 124 inspects the layers 128 after they have been formed and the additive manufacturing head continues to form portions of the layers 128. In this manner, the EMAT 124 can inspect the layers 128 as or after they are formed.

In at least one embodiment, the additive manufacturing head 112 is coupled to an actuator 142, such as a motor coupled to one or more wheel(s), conveyor(s), gear(s), pulley(s), and/or the like. The actuator 142 can be operatively coupled to a track 144, which may be secured within, over, and/or under the chamber 110 of the container 104. The actuator 142 is configured to move the additive manufacturing head 112, and therefore the EMAT 124, relative to the container 104 (shown in FIG. 1). Alternatively, one or both of the additive manufacturing head 112 and/or the EMAT 124 are fixed in place relative to the container 104.

FIG. 3 illustrates a schematic diagram of the EMAT 124 and the additive manufacturing head 112, according to an embodiment of the present disclosure. In this embodiment, the EMAT 124 and the additive manufacturing head 112 are separate and distinct from one another. For example, the EMAT 124 can be coupled to a first actuator 146 that moveably couples the EMAT 124 to a first track 148, and the additive manufacturing head 112 can be coupled to a second actuator 150 that moveably couples the additive manufacturing head 112 to a second track 152. Alternatively, one or both of the additive manufacturing head 112 and/or the EMAT 124 can be fixed in place.

FIG. 4 illustrates a schematic diagram of the inspection system 100 for an additively manufactured component 102, according to an embodiment of the present disclosure. As shown, the additive manufacturing head 112 is coupled to a first support member 160, such one or more brackets, beams, tracks, and/or the like, and the EMAT 124 is coupled to a second support member 162, such as one or more brackets, beams, tracks, and/or the like. The additive manufacturing head 112 and the EMAT 124 are both above the component 102. The component 102 is formed layer-by-layer by the additive manufacturing head 112 from a base towards an upper end in a bottom-up fashion. Optionally, one or both of the additive manufacturing head 112 and/or the EMAT 124 may be positioned below or to a side of the component 102.

In at least one embodiment, the additive manufacturing head 112 forms a layer 128 of the component 102 and then may be moved away from the component 102. Then, the EMAT 124 may be moved over the component 102 to inspect the layer 128. After the EMAT 124 has inspected the layer 128, the EMAT 124 is moved away from the component 102, and the additive manufacturing head 112 is moved above the layer 128 to form another layer 128 over the lower layer 128. The process then repeats.

Figure 5:
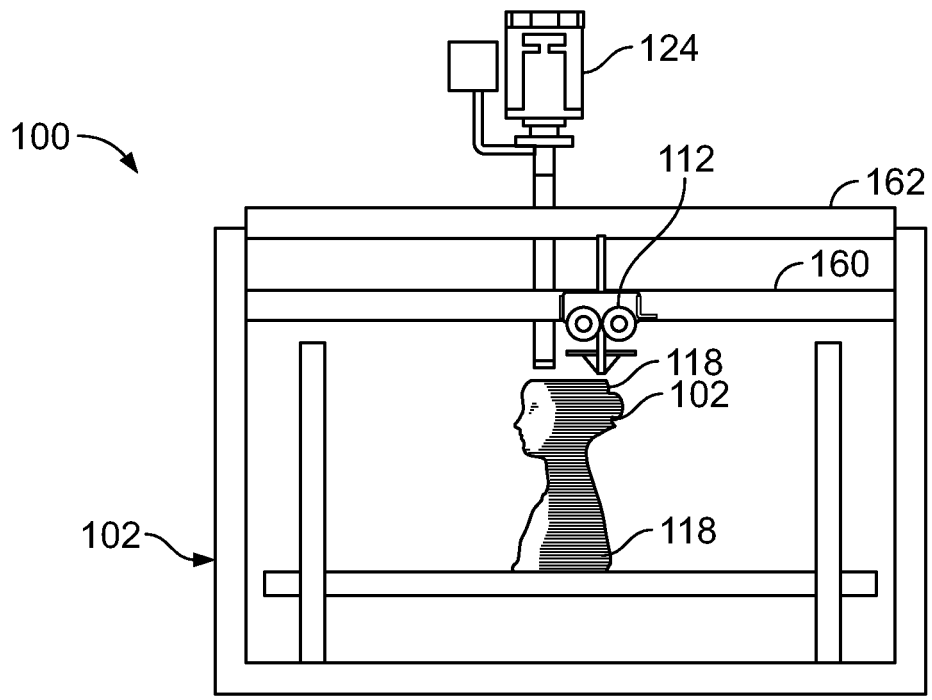
FIG. 5 illustrates a schematic diagram of an inspection system for an additively manufactured component, according to an embodiment of the present disclosure.

FIG. 5 illustrates a schematic diagram of the inspection system 100 for the additively manufactured component 102, according to an embodiment of the present disclosure. As shown, in at least one embodiment, the EMAT 124 may follow the additive manufacturing head 112 and inspect the layers 128 as they are formed.

Figure 6:
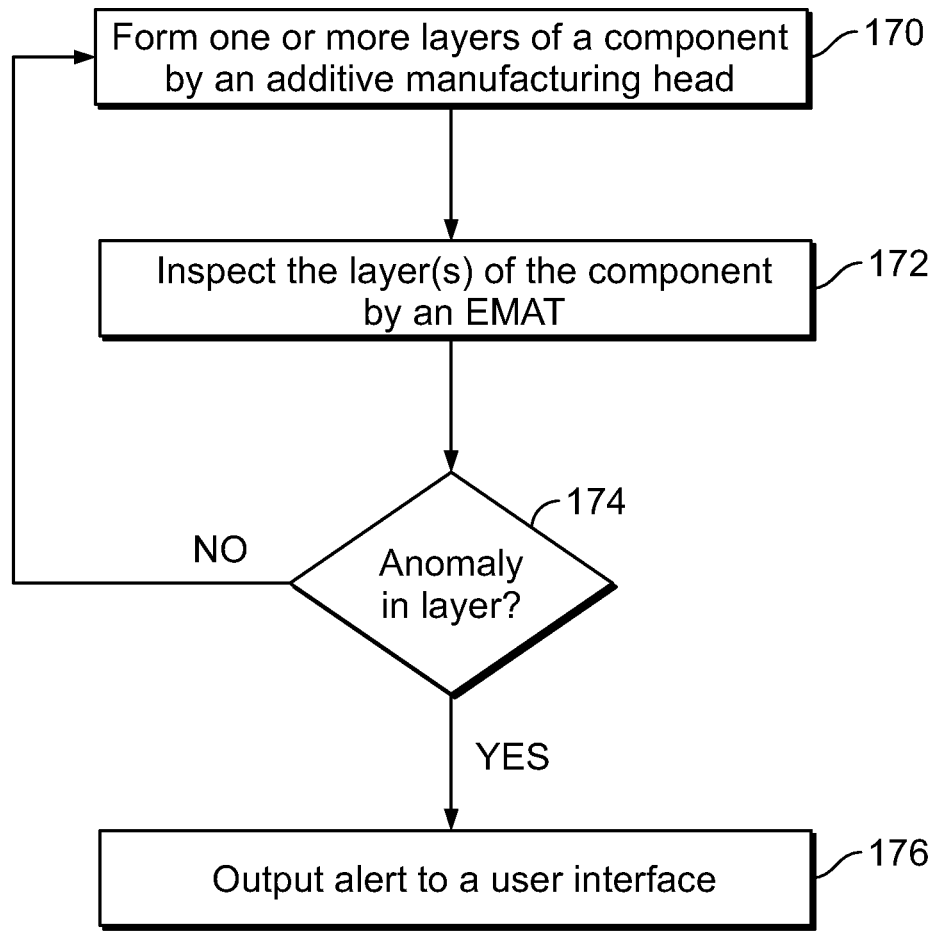
FIG. 6 illustrates a flow chart of an inspection method for an additively manufactured component, according to an embodiment of the present disclosure.

FIG. 6 illustrates a flow chart of an inspection method for an additively manufactured component, according to an embodiment of the present disclosure. Referring to FIGS. 1 and 6, at 170, the additive manufacturing head 112 forms one or more layers 128 of the component 102. At 172, the EMAT 124 inspects the layer(s) 118. For example, the EMAT 124 emits acoustic signal 125 into the layer(s) 118, and receives reflected acoustic signals 127 from the layers(s) 118, thereby generating inspection data regarding the layers 128. In at least one embodiment, the EMAT 124 inspects each layer 128 as or after it has been formed.

At 174, the inspection control unit 126 analyzes the inspection data generated by the EMAT 124 to determine if there are any anomalies within the layer(s) 118. For example, the inspection control unit 126 compares the inspection data with control or reference data of a layer having no anomalies. If the inspection control unit 126 determines that there are no anomalies at 174, the method returns to 170, at which a subsequent layer 128 (or layers) is formed. If, however, the inspection control unit 126 determines existence of an anomaly at 174, the method proceeds from 174 to 176, at which the inspection control unit 126 outputs an alert to the user interface 130. The alert can include an image and/or description of the anomaly.

Figure 7:
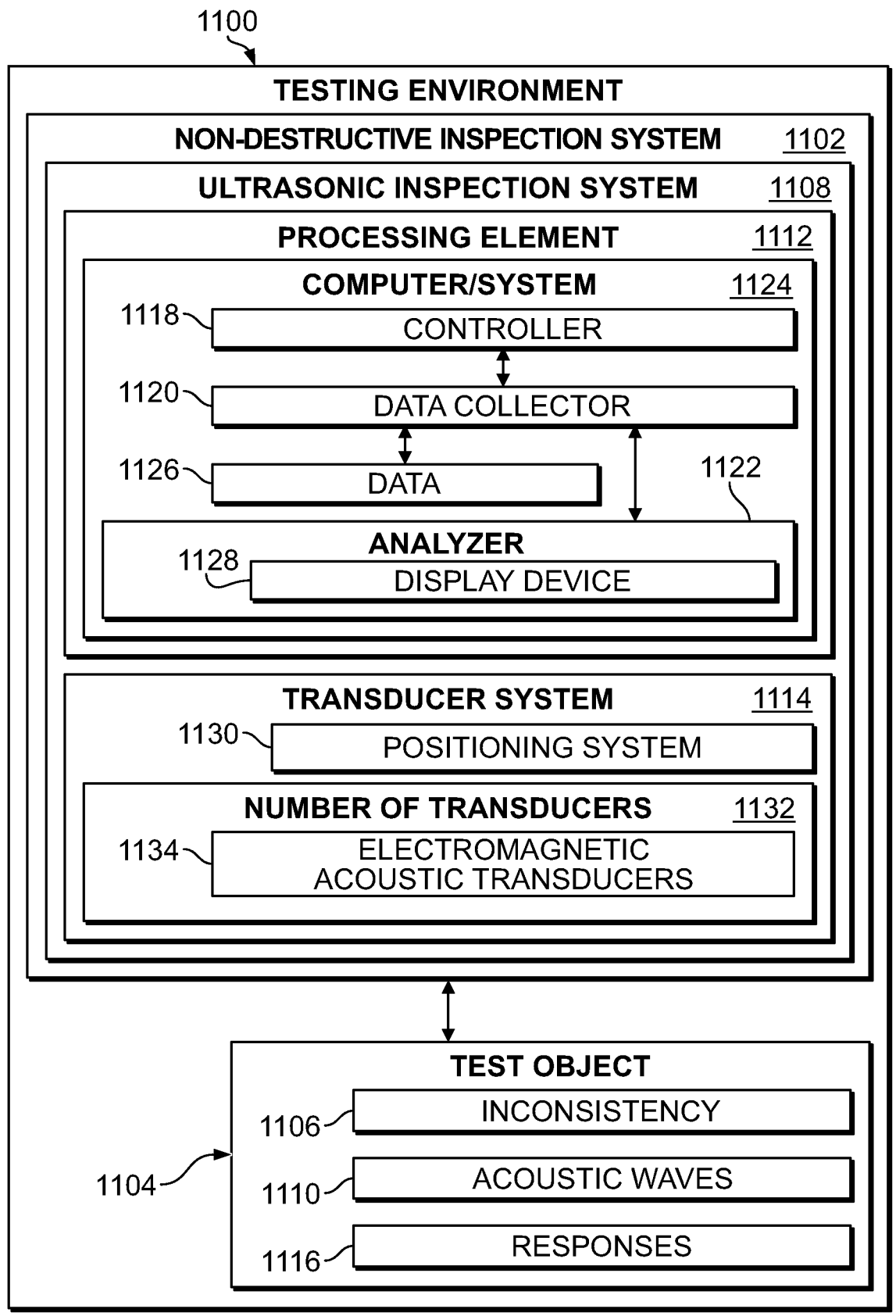
FIG. 7 illustrates a block diagram of a testing environment, according to an embodiment of the present disclosure.

FIG. 7 illustrates a block diagram of a testing environment, according to an embodiment of the present disclosure.

Certain embodiments recognize and take into account that most currently used magnets for electromagnetic acoustic transducers may not provide a magnetic field that is as strong as desired for generating acoustic waves with materials that have lower connectivities as compared to metals and alloys. For example, certain embodiments recognize and take into account that currently used electromagnetic acoustic transducers may have difficulties in generating desired acoustic waves in components such as composite structures.

Certain embodiments recognize and take into account that desired acoustic waves may be generated when the magnetic field is increased to a high enough level. Thus, certain embodiments provide a method and apparatus for generating acoustic waves in layers of components. In at least one embodiment, an apparatus includes a conductive material and a current inducer. The conductive material is configured to generate a magnetic field. The magnetic field has magnetic flux lines that are substantially fixed. Further, the current inducer is configured to cause an electric current in the layers that interacts with the magnetic field. The frequency of the electric current generates an acoustic test wave in the layers of the component.

Referring to FIG. 7, an illustration of a block diagram of a testing environment is depicted. In this illustrative example, testing environment 1100 includes non-destructive inspection (NDI) system 1102, which provides an example of the EMAT 124 and the inspection control unit 126 (shown in FIG. 1). As depicted, non-destructive inspection (NDI) system 1102 may be used to perform tests on test object 1104 (which is an example of the component 102 shown in FIG. 1). Test object 1104 may take a number of different forms. For example, test object 1104 may be selected from one of a skin panel, a composite skin panel, a metal skin panel, a fuselage, a wing, an engine housing, a composite structure, an aircraft, a spacecraft, a submarine, a mold, and/or other suitable objects.

For example, non-destructive inspection system 1102 may be used to determine whether inconsistency 1106 (such as an anomaly) is present in test object 1104.

In this illustrative example, non-destructive inspection system 1102 takes the form of ultrasonic inspection system 1108. Ultrasonic inspection system 1108 may be used to generate and detect acoustic waves 1110 in test object 1104. In these illustrative examples, ultrasonic inspection system 1108 includes processing element 1112 and transducer system 1114. Processing element 1112 is configured to cause transducer system 1114 to generate acoustic waves 1110 in test object 1104. Further, processing element 1112 is also configured to cause transducer system 1114 to detect responses 1116 generated from acoustic waves 1110.

In this illustrative example, processing element 1112 includes controller 1118, data collector 1120, and analyzer 1122. Controller 1118, data collector 1120, and analyzer 1122 may be implemented using hardware, software, or a combination of the two. As depicted, the components in processing element 1112 may be implemented using computer system 1124. Computer system 1124 is one or more computers. When more than one computer is present, these computers may communicate with each other through a medium such as a network.

Data collector 1120 is configured to record and store data 1126 for at least one of acoustic waves 1110 generated and responses 1116 detected in response to acoustic waves 1110.

As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. This data may include, for example, without limitation, amplitudes of acoustic waves 1110, amplitudes for responses 1116, times at which acoustic waves 1110 were transmitted, and times at which responses 1116 were received as well as other suitable types of data.

Analyzer 1122 is configured to analyze data 1126 and may determine whether inconsistency 1106 is present. Further, analyzer 1122 may display data 1126 on display device 1128 in computer system 1124.

As depicted, transducer system 1114 is implemented using hardware and comprises positioning system 1130 and number of transducers 1132. Positioning system 1130 may be a fixed system or may be a moveable system. When positioning system 1130 is a moveable system, positioning system 1130 may be a robotic or some other suitable automated system under the control of controller 1118. Number of transducers 1132, in these illustrative examples, takes the form of electromagnetic acoustic transducers 1134. The electromagnetic acoustic transducers 1134 are examples of the EMAT 124 shown in FIG. 1.

Figure 8:
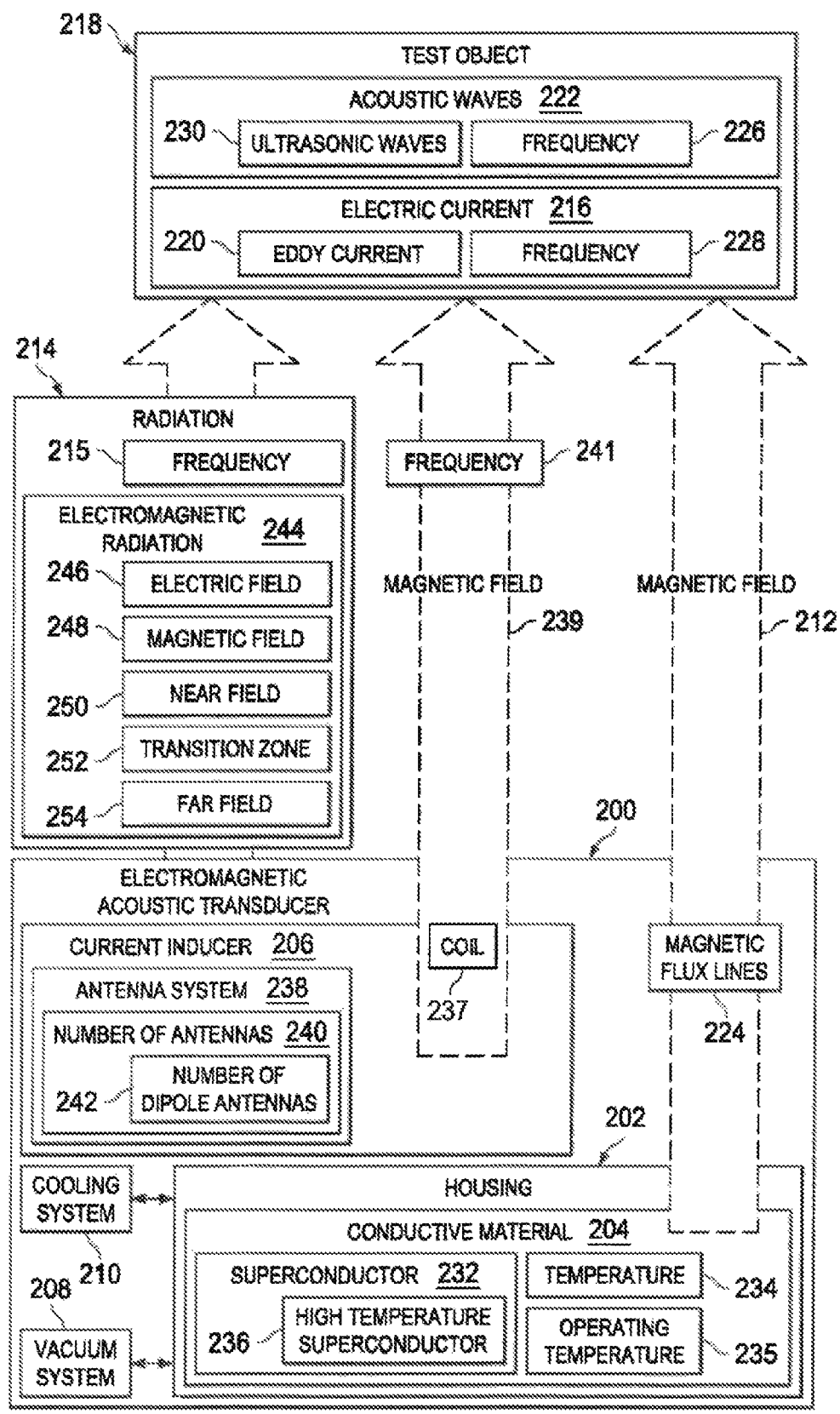
FIG. 8 illustrates a block diagram of an electromagnetic acoustic transducer, according to an embodiment of the present disclosure.

Turning now to FIG. 8, an illustration of a block diagram of an electromagnetic acoustic transducer is depicted in accordance with an advantageous embodiment. In this illustrative example, electromagnetic acoustic transducer 200 is an example of an EMAT 124 shown in FIG. 1, and an EMAT 1134 shown in FIG. 7.

In these illustrative examples, electromagnetic acoustic transducer 200 may include housing 202, conductive material 204, current inducer 206, vacuum system 208, and cooling system 210. In these illustrative examples, conductive material 204, current inducer 206, vacuum system 208, and cooling system 210 are associated with housing 202.

When one component is "associated" with another component, the association is a physical association in these depicted examples. For example, a first component may be considered to be associated with a second component by being secured to the second component, bonded to the second component, mounted to the second component, welded to the second component, fastened to the second component, and or connected to the second component in some other suitable manner. The first component also may be connected to the second component using a third component. The first component also may be considered to be associated with the second component by being formed as part of and or an extension of the second component.

In this illustrative example, conductive material 204 is a magnetic field source and is configured to generate magnetic field 212. Current inducer 206 is configured to generate radiation 214 with frequency 215. Radiation 214 causes electric current 216 to flow within test object 218 in this illustrative example. In particular, electric current 216 may take the form of eddy current 220.

When electric current 216 interacts with magnetic field 212, acoustic waves 222 are generated. As depicted, frequency 228 is derived from frequency 215 of radiation 214 in these illustrative examples. In other words, frequency 228 is determined by frequency 215. In the illustrative example, frequency 228 is the same as frequency 215. This change results in acoustic waves 222 with frequency 226. In these illustrative examples, controller 1118 in FIG. 7 is configured to cause current inducer 206 to generate electric current 216 with frequency 228 that causes acoustic waves 222 to have frequency 226, which is a desired frequency in these illustrative examples.

In these illustrative examples, acoustic waves 222 take the form of ultrasonic waves 230. Frequency 226 of acoustic waves 222 is selected by selecting frequency 228 for radiation 214. Frequency 226 of acoustic waves 222 may be, for example, from about 20 kHz to about 20 MHz. It is to be understood that the frequencies used may depend on the particular implementation.

Conductive material 204 is configured to generate magnetic field 212 having magnetic flux lines 224 that are substantially fixed. When magnetic flux lines 224 are substantially fixed for conductive material 204, conductive material 204 is a trapped field conductive material. Magnetic flux lines 224 are substantially fixed relative to electromagnetic acoustic transducer 200. A permanent magnet includes magnetized domains that are oriented in the same direction when exposed to an external magnetic field. In contrast, a trapped field conductive material has no magnetized parts until the trapped field conductive material is exposed to an external field. After exposure to an external magnetic field, the trapped field conductive material magnetizes and can maintain part of its magnetization after the external field is removed.

Conductive material 204 is selected as a material having substantially zero electrical resistance at a selected temperature or range of temperatures. In these illustrative examples, conductive material 204 takes the form of superconductor 232. Superconductor 232 is configured to have substantially zero electrical resistance when temperature 234 of superconductor 232 is reduced to being less than or equal to operating temperature 235. In these illustrative examples, conductive material 204 may be selected from one of bismuth strontium calcium copper oxide, yttrium barium copper oxide (YBCO), magnesium diboride, lanthanum barium copper oxide, bisethylenedithio-tetrathiafulvalene, and other suitable materials. In the illustrative examples, yttrium in yttrium barium copper oxide may be replaced materials, such as, for example, gadolinium, dysprosium, neodymium, samarium, europium, and other rare earths materials. For example, gadolinium barium copper oxide, dysprosium barium copper oxide, neodymium barium copper oxide, samarium barium copper oxide, and europium barium copper oxide may be used. The use of these materials also may result in conductive material 204 producing a desired trapped flux.

The critical temperature of superconductor 232 is the temperature at and below which the electrical resistance becomes zero. Operating temperature 235 of superconductor 232 is at or below the critical temperature in these illustrative examples.

Superconductor 232 may be selected as high temperature superconductor 236. High temperature superconductor 236 is comprised of a conductive material that has substantially zero resistance at temperatures greater than about 30 degrees Kelvin.

In these illustrative examples, vacuum system 208 and cooling system 210 are configured for use in maintaining temperature 234 of conductive material 204 at a level at which substantially zero resistance is present and at a level at which magnetic flux lines 224 in magnetic field 212 are substantially fixed. In these illustrative examples, vacuum system 208 is configured to create a vacuum around conductive material 204. This vacuum along with cooling system 210 may maintain temperature 234 of conductive material 204 at a desired temperature.

By being substantially fixed, magnetic flux lines 224 remain substantially in the same place when conductive material 204 does not move. In these illustrative examples, current inducer 206 comprises at least one of coil 237 and antenna system 238. Coil 237 is configured to generate magnetic field 239 with frequency 241 in a manner that causes electric current 216 to flow in test object 218 with frequency 228. Coil 237 may be any coil that is capable of generating magnetic field 239 in a way to cause the flow of electric current 216 within test object 218.

As depicted, antenna system 238 has number of antennas 240. As used herein, a "number", when used with reference to items, means one or more items. For example, "number of antennas 240" is one or more antennas.

Number of antennas 240 may take various forms. For example, number of antennas 240 may be number of dipole antennas 242. Antenna system 238 is configured to generate radiation 214 in the form of electromagnetic radiation 244. Electromagnetic radiation 244 has electric field 246 and magnetic field 248.

In these illustrative examples, electromagnetic radiation 244 may have near field 250, transition zone 252, and far field 254. Near field 250 is the desired portion of electromagnetic radiation 244 that encompasses test object 218 in the depicted examples. In other words, near field 250 encompasses at least a portion of test object 218 such that electric current 216 flows in test object 218. Near field 250 is the portion of electromagnetic radiation 244 that is within about one wavelength in distance from antenna system 238.

In these illustrative examples, if the electrical conductivity of the test sample is anisotropic or contains acicular inclusions such as fibers in which the electrical conductivity of the acicular inclusion is greater than the rest of the material, electric field 246 is preferably configured to be a larger component in electromagnetic radiation 244 as compared to magnetic field 248 for near field 250 of electromagnetic radiation 244.

In these illustrative examples, electric field 246 is the component of electromagnetic radiation 244 that causes electric current 216 to flow in test object 218. Otherwise, magnetic field 248 is preferably configured to be a larger component in electromagnetic radiation 244 as compared to electric field 246 for near field 250 of electromagnetic radiation 244.

Further, if test object 218 is comprised of ferromagnetic material, acoustic waves 222 may be generated using magnetorestriction. In magnetorestriction, a ferromagnetic material has a dimensional change when an external magnetic field is applied. By changing the field with some frequency, the magnetorestriction may cause a disturbance that propagates as an acoustic wave.

In these illustrative examples, conductive material 204 is not a permanent magnet. As a result, magnetic field 212 is induced in conductive material 204 prior to using electromagnetic acoustic transducer 200.

Figure 9:
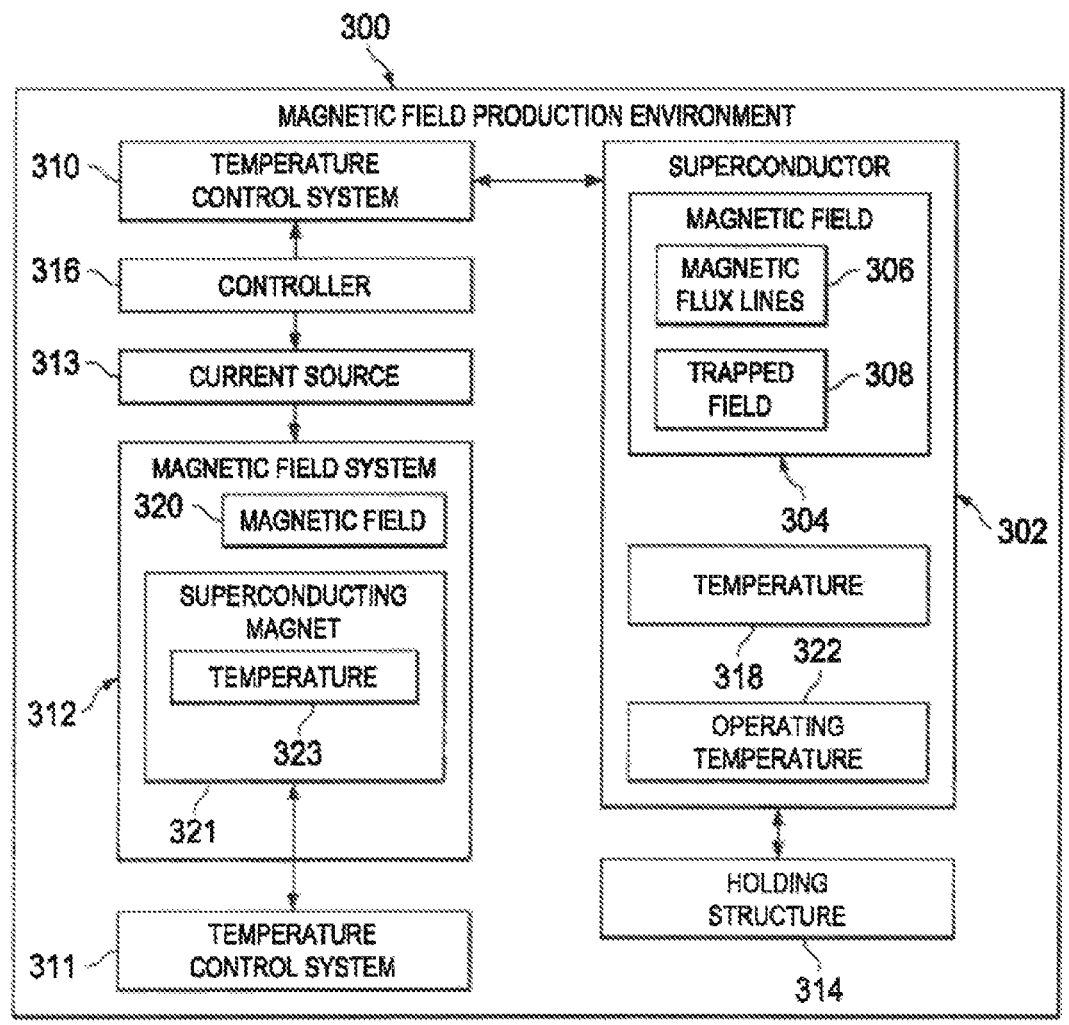
FIG. 9 illustrates a block diagram of a magnetic field production environment, according to an embodiment of the present disclosure.

Turning now to FIG. 9, an illustration of a block diagram of a magnetic field production environment is depicted in accordance with an advantageous embodiment. Magnetic field production environment 300 is configured to cause superconductor 302 to generate magnetic field 304 with substantially fixed magnetic flux lines 306. More specifically, magnetic field production environment 300 may be used to cause superconductor 302 to have trapped field 308.

As depicted, magnetic field production environment 300 includes temperature control system 310, temperature control system 311, magnetic field system 312, current source 313, holding structure 314, and controller 316. Temperature control system 310 is configured to control temperature 318 of superconductor 302. Magnetic field system 312 is configured to generate magnetic field 320. As illustrated, magnetic field system 312 may be implemented using superconducting magnet 321. This magnetic field is a second magnetic field. Magnetic field 320 is generated prior to superconductor 302 generating the first magnetic field, magnetic field 304. Holding structure 314 is configured to hold superconductor 302. In particular, holding structure 314 is configured to hold superconductor 302 in a fixed position relative to magnetic field system 312.

In this illustrative example, temperature control system 310 is configured to change temperature 318 of superconductor 302 to a temperature greater than operating temperature 322. Operating temperature 322 is a temperature at which superconductor 302 has substantially zero resistance to an electric current. Further, operating temperature 322 may also be the temperature at which superconductor 302 has sufficient current density to trap magnetic field 304.

In these illustrative examples, the critical temperature may be the temperature at which superconductor 302 has substantially zero resistance to an electric current and has a current density that is substantially equal to zero. Operating temperature 322 is below the critical temperature for superconductor 302 so that a non-zero current density may exist to support the trapped field. Under these conditions, superconductor 302 may be a trapped field superconductor.

With temperature 318 greater than operating temperature 322, controller 316 causes magnetic field system 312 to generate magnetic field 320. In particular, controller 316 may control current source 313 to send an electric current to operate superconducting magnet 321 in magnetic field system 312 to generate magnetic field 320. In these illustrative examples, current source 313 is an alternating current source.

In this illustrative example, temperature control system 311 is configured to cool magnetic field system 312. In particular, temperature control system 311 may maintain temperature 323 of superconducting magnet 321 at an operating temperature at which superconducting magnet 321 generates magnetic field 320 at a desired level.

While magnetic field 320 is held constant, controller 316 causes temperature control system 311 to lower temperature 318 of superconductor 302. In particular, temperature 318 is lowered to or below operating temperature 322 of superconductor 302.

When temperature 318 reaches or moves below operating temperature 322, controller 316 causes magnetic field system 312 to reduce magnetic field 320. In these illustrative examples, magnetic field 320 may be about 10 Teslas. Magnetic field 320 may vary from about 2 Teslas to about 15 Teslas in some illustrative examples. Of course, other values for magnetic field 320 may be present depending on the particular implementation.

The rate at which magnetic field 320 is reduced may depend on magnetic field system 312. For example, superconducting magnet 321 may have superconducting wires. The rate at which magnetic field 320 may be reduced is a rate that avoids quenching the superconducting wires in superconducting magnet 321. Quenching may occur when the superconducting wires enter a resistive state and no longer provide magnetic operation. This rate may be, for example, about 1 Tesla per 100 seconds. Of course, the rate may vary depending on superconducting magnet 321.

At this point, superconductor 302 may be used in an electromagnetic acoustic transducer such as electromagnetic acoustic transducer 200 in FIG. 8. In some illustrative examples, the entire electromagnetic acoustic transducer may be cooled rather than removing superconductor 302 from the electromagnetic acoustic transducer.

The illustrations of testing environment 1100 in FIG. 7, electromagnetic acoustic transducer 200 in FIG. 8, and magnetic field production environment 300 in FIG. 9 are not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, data collector 1120 and analyzer 1122 may be combined as a single component. In still other illustrative examples, vacuum system 208 may be omitted or may be implemented as part of cooling system 210. In still other illustrative examples, current inducer 206 may be attached to or incorporated as part of housing 202 and/or another structure depending on the particular implementation. In another example, holding structure 314 may be part of temperature control system 310.

In yet another example, although conductive material 204 has been illustrated as superconductor 232, more than one superconductor may be used. In other words, more than one type of superconductor may be used and more than one superconductor structure may be used. Different types of superconductors and superconductor structures in addition to superconductor 232 may be employed to provide different orientations and patterns of magnetic field 212.

Figure 10:
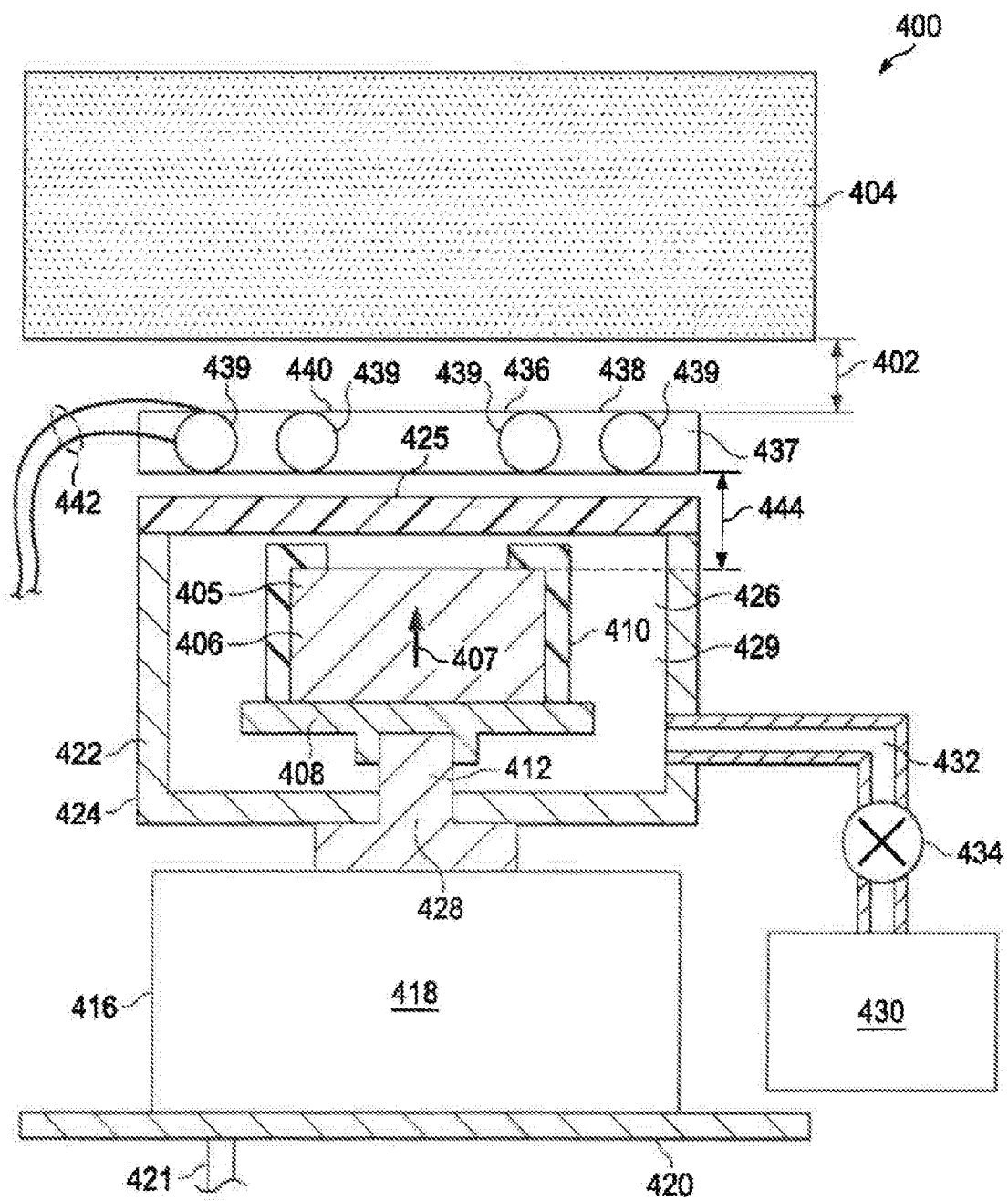
FIG. 10 illustrates a cross-sectional view of an electromagnetic acoustic transducer, according to an embodiment of the present disclosure.

With reference next to FIG. 10, an illustration of a cross-sectional view of an electromagnetic acoustic transducer is depicted in accordance with an advantageous embodiment. In this illustrative example, electromagnetic acoustic transducer 400 is an example of one implementation for electromagnetic acoustic transducer 124 in FIG. 1, 200 in FIG. 8, and 1134 in FIG. 7.

In this cross-sectional view, electromagnetic acoustic transducer 400 has distance 402 from test object 404 (which is an example of the component 102 shown in FIG. 1). In other words, electromagnetic acoustic transducer 400 is not in physical contact with test object 404.

As depicted, electromagnetic acoustic transducer 400 includes conductive material 405. In this example, conductive material 405 takes the form of high temperature superconductor 406.

High temperature superconductor 406 has magnetic flux lines that are fixed. In other words, high temperature superconductor 406 has a trapped field that provides a magnetic field in the direction of arrow 407. In this illustrative example, arrow 407 is along a center line for high temperature superconductor 406.

High temperature superconductor 406 has the shape of a cylinder with a circular cross section. Of course, high temperature superconductor 406 may have other cross-sectional shapes. For example, the shape may be a square, a pentagon, a hexagon, or some other suitable shape.

As depicted, high temperature superconductor 406 is in contact with structure 408. More specifically, high temperature superconductor 406 is in physical and thermal contact with structure 408. In other words, heat may be conducted between high temperature superconductor 406 and structure 408.

In this illustrative example, structure 408 is configured to hold high temperature superconductor 406 within electromagnetic acoustic transducer 400. Structure 408 may be comprised of any material that conducts heat. As depicted, structure 408 is comprised of copper. Clamp 410 holds high temperature superconductor 406 in place with respect to structure 408.

In these illustrative examples, structure 408 is connected to cooling system 416. In this illustrative example, cooling system 416 includes cryocooler 418. More specifically, cooling system 416 is thermally connected to cold head 412 of cryocooler 418.

Cryocooler 418 may be implemented using any device configured to maintain the temperature of high temperature superconductor 406 at an operating temperature or below the operating temperature for high temperature superconductor 406 in these illustrative examples. As depicted, cryocooler 418 may be mounted on plate 420. Power connector 421 may be connected to a power source to provide power to operate cryocooler 418. Alternatively, cryocooler 418 may be, for example, a container with liquid nitrogen.

Additionally, electromagnetic acoustic transducer 400 has housing 422. Housing 422 has walls 424 and end cap 425 that define cavity 426 in which high temperature superconductor 406, clamp 410, and a portion of cold head 412 are located.

End cap 425 is removable. Removal of end cap 425 allows access to cavity 426. Cold head 412 extends into cavity 426 through opening 428 in walls 424.

Cavity 426 may be a vacuum space in which a vacuum is generated within housing 422. Further, insulation 429 may be present within cavity 426. Insulation 429 is configured to reduce the transfer of heat between high temperature superconductor 406, walls 424, and end cap 425. Insulation 429 may take the form of multi-layer insulation. Insulation 429 may be, for example, sheets of aluminized biaxially-oriented polyethylene terephthalate or other suitable types of insulation.

In this illustrative example, vacuum pump 430 also is mounted on plate 420. Vacuum pump 430 is connected to housing 422 by tube 432. Once a vacuum has been established in cavity 426, valve 434 may be closed and vacuum pump 430 may be disconnected from tube 432. In these illustrative examples, vacuum pump 430 and insulation 429 may reduce heat from reaching cold head 412 and high temperature superconductor 406.

As depicted, current inducer 436 in electromagnetic acoustic transducer 400 takes the form of coil 437 and/or antenna system 438 in these illustrative examples. As depicted, current inducer 436 may have elements 439 and support structure 440. When current inducer 436 takes the form of coil 437, elements 439 may be windings in a coil for coil 437. When current inducer 436 takes the form of antenna system 438, elements 439 may take the form of antenna elements. Additionally, current inducer 436 has wires 442 that may be connected to a radio frequency signal generator.

Support structure 440 with elements 439 is located between test object 404 and end cap 425. In this illustrative example, antenna system 438 is not connected to housing 422. Of course, in other illustrative examples, support structure 440 for antenna system 438 may be connected to housing 422, plate 420, or some other structure for positioning antenna system 438.

In this illustrative example, antenna system 438 has distance 444 to high temperature superconductor 406. Distance 444 may be fixed or adjustable depending on the particular implementation.

Figure 11:
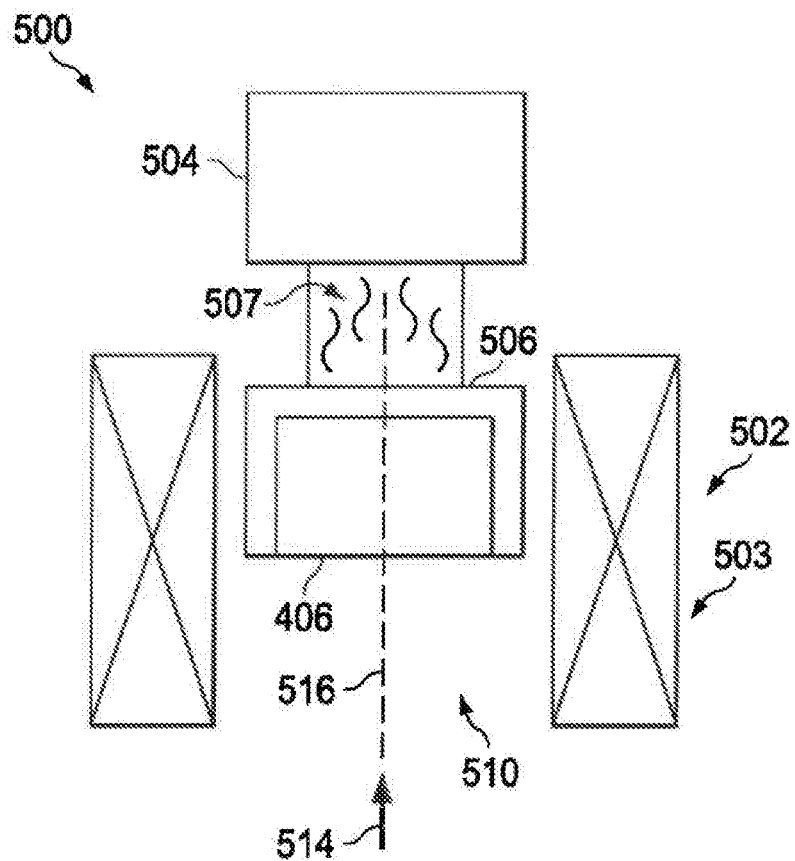
FIG. 11 illustrates an implementation for a magnetic field and production environment, according to an embodiment of the present disclosure.

Turning now to FIG. 11, an illustration of an implementation for a magnetic field and production environment is depicted in accordance with an advantageous embodiment.

In this illustrative example, magnetic field production environment 500 is shown in a cross-sectional view and is an example of one implementation for magnetic field production environment 300 in FIG. 9.

As depicted, magnetic field production environment 500 includes magnetic field system 502 which takes the form of superconducting magnet 503. Additionally, in this illustrative example, temperature control system 504 includes holding structure 506 that is configured to high temperature superconductor 406 in a fixed position while a magnetic field with substantially fixed magnetic flux lines is generated in high temperature superconductor 406.

In this illustrative example, holding structure 506 with high temperature superconductor 406 is placed inside of bore 510 of superconducting magnet 503. Bore 510 may have a temperature that is substantially the same as the ambient temperature in these illustrative examples. In other words, the temperature in bore 510 is independent of the temperature in the windings within superconducting magnet 503.

In these illustrative examples, bore 510 may have a diameter greater than about one inch. Of course, the diameter may be any diameter that may be configured to receive high temperature superconductor 406 and any components holding high temperature superconductor 406, such as holding structure 506.

In this illustrative example, high temperature superconductor 406 initially has a temperature greater than its operating temperature. Superconducting magnet 503 is operated to generate a magnetic field in bore 510. The magnetic field is increased to a magnetizing value.

As depicted, the magnetizing value is the strength of the magnetic field that high temperature superconductor 406 is exposed to as the temperature of high temperature superconductor 406 is reduced to an operating temperature. Further, in these illustrative examples, the magnetizing value may be greater than the desired value for the trapped magnetic field in high temperature superconductor 406.

The magnetic field generated by superconducting magnet 503 is held constant while the temperature of high temperature superconductor 406 is lowered by temperature control system 504. The temperature may be lowered to the operating temperature of high temperature superconductor 406 or to an even lower temperature depending on the particular implementation. Once high temperature superconductor 406 reaches the operating temperature, the magnetic field generated by superconducting magnet 503 is reduced. In another illustrative example, rather than ramping or reducing the magnetic field generated by superconducting magnet 503, high temperature superconductor 406 may be physically removed from bore 510.

Thereafter, high temperature superconductor 406 may be moved in housing 422 in electromagnetic acoustic transducer 400 and placed on structure 408 and held in place with clamp 410 in FIG. 10.

The movement of high temperature superconductor 406 may be performed in a vacuum, dry atmosphere, or some other suitable environment. The transfer is performed in a manner that avoids increasing the temperature of high temperature superconductor 406 such that the temperature of high temperature superconductor 406 does not increase in a manner that the magnetic flux lines in the magnetic field generated by high temperature superconductor 406 are no longer substantially fixed.

In a superconductor, the critical current density increases as the temperature decreases from a current density of zero at the critical temperature to some value at absolute zero. In these illustrative examples, critical current density is when the current density is strong enough to produce a non-zero electrical resistivity in the superconductor. The magnitude of the trapped field will be approximately proportional to the current density. As a result, as operating temperature decreases, the strength of the trapped field increases. However, the trapped field cannot be higher than the magnetizing field in the illustrative examples. In some illustrative examples, heat capacity is less as the temperature decreases. As a result, the superconductor may quench more easily than desired. As a result, a superconductor with a higher operating temperature is desirable.

Temperature control system 504 may be implemented in a number of different ways. For example, temperature control system 504 may include a helium gas source that flows to high temperature superconductor 406 through holding structure 506. Alternatively, liquid may be used. For example, without limitation, the liquids used in temperature control system 504 may be liquid helium, liquid nitrogen, liquid hydrogen, liquid neon, liquid oxygen, and combinations of these liquids.

In other illustrative examples, temperature control system 504 may comprise a liquid helium source in which helium 507 flows in contact with at least one of holding structure 506 and high temperature superconductor 406. In other examples, a cryocooler may be placed in thermal contact with at least one of holding structure 506 and high temperature superconductor 406.

In this illustrative example, superconducting magnet 503 may be constructed from a number of different materials. For example, superconducting magnet 503 may be constructed from NbTi or $Nb_3Nn$. Superconducting magnet 503, for example, without limitation, may be cooled to an operating temperature through liquid helium, a super fluid helium cryostat, or a cryocooler.

In these illustrative examples, the magnetic field inside of bore 510 of superconducting magnet 503 is in the direction of arrow 514 in center line 516 of bore 510. As a result, the magnetic field generated by high temperature superconductor 406 is also along the direction of arrow 514.

In some illustrative examples, electromagnetic acoustic transducer 400 in FIG. 10 with high temperature superconductor 406 may be placed in bore 510, or superconducting magnet 503 may be placed around electromagnetic acoustic transducer 400. This type of placement avoids the need to transfer high temperature superconductor 406 from holding structure 506 to housing 422.

As a result, the need for placing electromagnetic acoustic transducer 400 in a vacuum chamber to transfer high temperature superconductor 406 from holding structure 506 to housing 422 may be avoided. In this illustrative example, only housing 422 may need to be within bore 510. Other components such as cryocooler 418 and antenna system 438 in FIG. 10 may be on the fringe or outside of bore 510.

In still another illustrative example, high temperature superconductor 406 may be exposed to a series of pulses of a magnetic field generated by a magnet. In these illustrative examples, superconducting magnet 503 is replaced with a non-superconducting magnet when a series of pulses are generated. For pulsed fields, the magnet used is not superconducting magnet 503 in the illustrative examples. However, superconducting magnet 503 could be used in some illustrative examples.

In this illustrative example, high temperature superconductor 406 may be at the operating temperature for high temperature superconductor 406 or substantially close to the operating temperature for high temperature superconductor 406 when the pulses of the magnetic field are delivered to high temperature superconductor 406 from a magnet used in place of superconducting magnet 503.

When pulses of a magnetic field are used to produce the trapped field in high temperature superconductor 406, the magnetic field of the pulses are higher than when the field from superconducting magnet 503 can be held steady and the temperature of high temperature superconductor 406 is reduced to at or below an operating temperature for high temperature superconductor 406. These two conditions are used to obtain a trapped field in high temperature superconductor 406.

Figure 12:
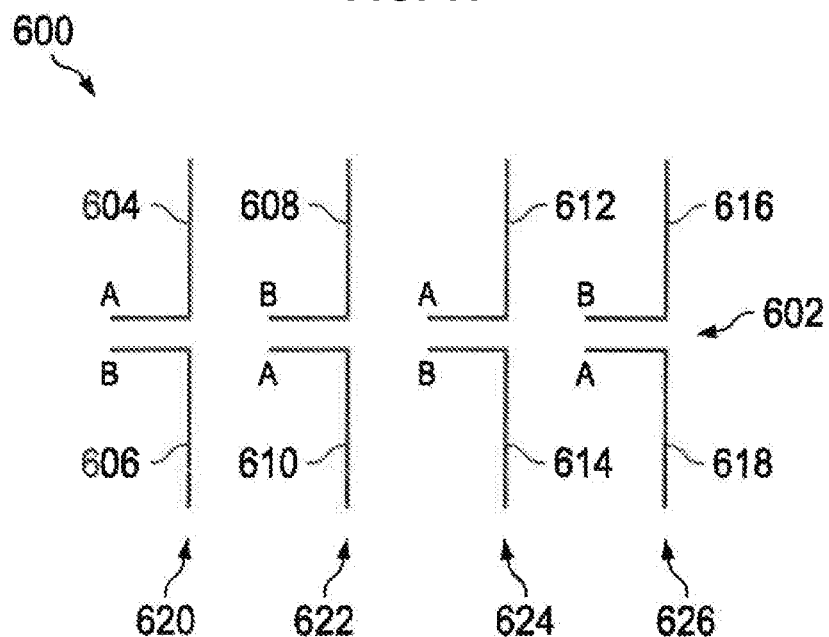
FIG. 12 illustrates an antenna, according to an embodiment of the present disclosure.

Turning now to FIG. 12, an illustration of an antenna is depicted in accordance with an advantageous embodiment. In this illustrative example, antenna 600 is an example of an implementation of an antenna in antenna system 438 in FIG. 10. In this illustrative example, antenna 600 takes the form of dipole antenna array 602. Antenna 600 includes antenna elements 604, 606, 608, 610, 612, 614, 616, and 618. In this illustrative example, the letter "A" refers to one terminal of a radio frequency signal generator and the letter "B" refers to another terminal on the radio frequency signal generator. These letters identify the terminals to which different antenna elements are connected. In this illustrative example, the connection and arrangement of antenna elements 604, 606, 608, 610, 612, 614, 616, and 618 generates an electric field pattern that has four rows of excitation. Each row is about 180 degrees out of phase with another row.

As depicted, antenna element 604 and antenna element 606 form row 620. Antenna element 608 and antenna element 610 form row 622. Antenna element 612 and antenna element 614 form row 624, and antenna element 616 and antenna element 618 form row 626.

Of course, this illustration of antenna 600 is only one example and any number of elements may be used in this illustrative configuration. Further, other configurations may be used with other types of antenna geometries.

Figure 13:
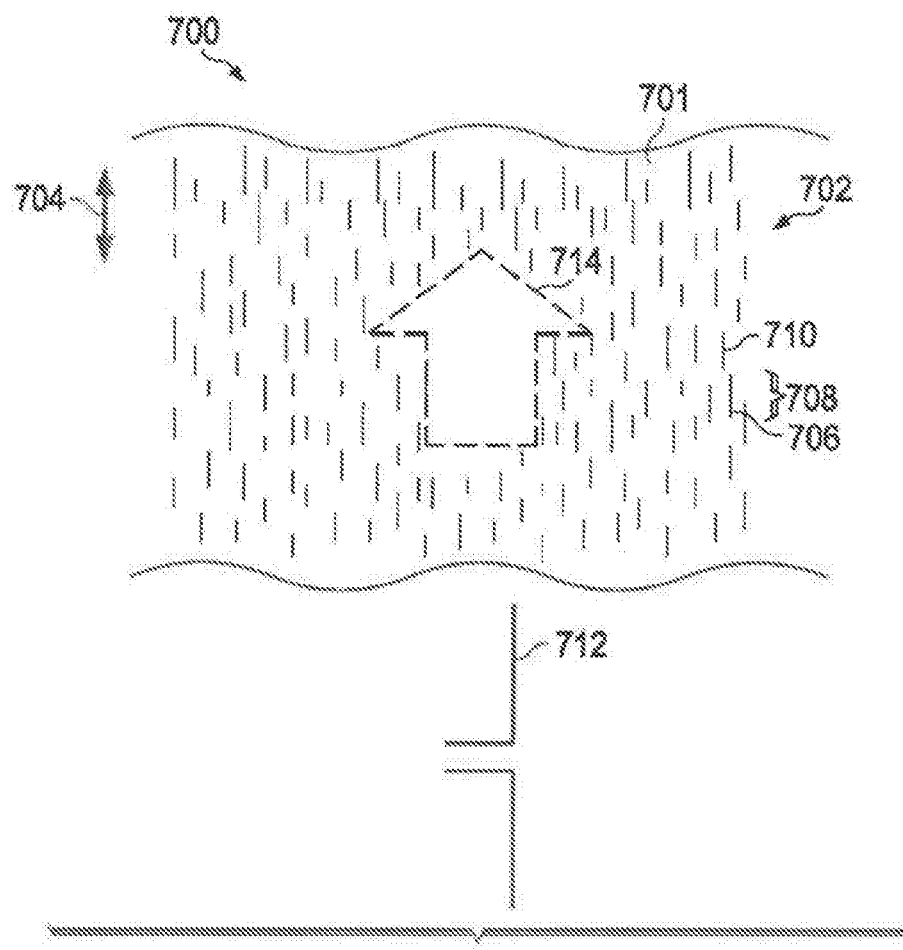
FIG. 13 illustrates an electric field aligned with a test object, according to an embodiment of the present disclosure.

Turning next to FIG. 13, an illustration of an electric field aligned with a test object is depicted in accordance with an advantageous embodiment. In this illustrative example, test object 700 has layer 701, which is comprised of carbon fibers 702. In these illustrative examples, carbon fibers 702 are aligned in the direction of arrow 704.

Carbon fibers 702 are electrically conductive along their fiber length. For example, carbon fiber 706 is conductive along length 708. The different advantageous embodiments recognize and take into account that the conductivity from fiber to fiber may not be as great as desired. For example, conductivity from carbon fiber 706 to carbon fiber 710 may require more current than desired to produce a large enough signal to detect an inconsistency.

In the illustrative examples, antenna 712 may be configured to generate electromagnetic radiation with an electric field having electric field vector 714 that is substantially aligned in the direction of carbon fibers 702. In this manner, electromagnetic radiation generated by antenna 712 may cause a current to flow along each carbon fiber in carbon fibers 702 in the direction of arrow 704.

Further, other layers in test object 700 may have carbon fibers with a different orientation. Antenna 712 may be configured to selectively cause a current in layers having an orientation that is aligned with electric field vector 714. This current may then interact with a magnetic field from a superconductor to cause a Lorenz force that results in an acoustic wave within test object 700.

The illustrations of components in FIG. 10-13 may be combined with the components illustrated in FIGS. 7-9, used with components in FIGS. 7-9, or a combination of the two. Additionally, some of the components illustrated in FIGS. 10-13 may be illustrative examples of how components shown in block form in FIGS. 7-9 can be implemented as physical structures.

Further, the illustrations of electromagnetic acoustic transducer 400 in FIG. 10, magnetic field production environment 500 in FIG. 11, antenna 600 in FIG. 12, and test object 700 in FIG. 13 are not meant to imply physical or architectural limitations to the manner in which an advantageous embodiment may be implemented. These components are illustrations of one manner in which an advantageous embodiment may be implemented.

Detection of an acoustic wave using an electromagnetic acoustic transducer may occur by monitoring a change in a magnetic field, an electric field, or both in response to the response of the acoustic wave that moves through a magnetic field and generates a current. A current has an electric field and a magnetic field. The electric field, the magnetic field, or both may be measured. In these illustrative examples, this measurement may be made through the current inducer which is a coil, antenna, or some other suitable device.

Figure 14:
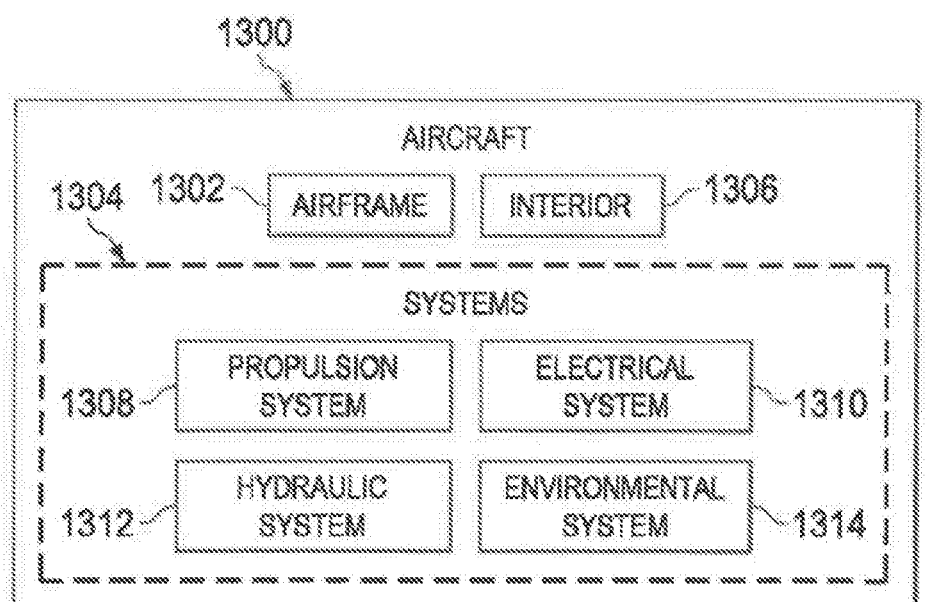
FIG. 14 illustrates an aircraft in which an advantageous embodiment may be implemented.

Advantageous embodiments of the disclosure may be described in the context of aircraft manufacturing and service method and aircraft 1300 as shown in FIG. 14. During pre-production, aircraft manufacturing and service method may include specification and design of aircraft 1300 and material procurement.

During production, component and subassembly manufacturing and system integration of aircraft 1300 takes place. Thereafter, aircraft 1300 may go through certification and delivery in order to be placed in service. While in service by a customer, aircraft 1300 is scheduled for routine maintenance and service, which may include modification, reconfiguration, refurbishment, and other maintenance or service.

In the example of FIG. 14, aircraft 1300 includes airframe 1302 with plurality of systems 1304 and interior 1306. Examples of systems 1304 may include one or more of propulsion system 1308, electrical system 1310, hydraulic system 1312, and environmental system 1314. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method to inspect aircraft 1300 or components for aircraft 1300. For example, ultrasonic inspection system 1108 in FIG. 7 may be used to perform non-destructive inspections on aircraft 1300 or components for aircraft 1300 during one or more stages of aircraft manufacturing and service method. The use of a number of the different advantageous embodiments may substantially expedite the assembly of and/or reduce the cost of aircraft 1300.

As described herein, embodiments of the present disclosure provide cost-effective and efficient non-destructive and non-contact systems and methods for inspecting an additively manufactured component.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for inspecting an additively manufactured component, the system comprising:
    an additive manufacturing head configured to form a component layer-by-layer, wherein the additive manufacturing head moves as the additive manufacturing head forms the component layer-by-layer; and
    an electromagnetic acoustic transducer (EMAT) configured to inspect one or more layers of the component, wherein the EMAT follows behind the additive manufacturing head as the additive manufacturing head moves as the additive manufacturing head forms the component layer-by-layer, and wherein the EMAT inspects the component as the EMAT follows behind the additive manufacturing head.

2. The system of claim 1, further comprising a container defining a chamber, wherein the additive manufacturing head is configured to form the component within the container.

3. The system of claim 2, wherein one or both of the additive manufacturing head or the EMAT are within the chamber.

4. The system of claim 1, wherein the EMAT is configured to inspect the one or more layers of the component after the one or more layers are formed by the additive manufacturing head.

5. The system of claim 1, wherein the EMAT does not contact the one or more layers of the component.

6. The system of claim 1, further comprising an inspection control unit in communication with the EMAT, wherein the inspection control unit is configured to analyze inspection data regarding the one or more layers to determine existence of one or more anomalies within or between the one or more layers, wherein the inspection data is generated by the EMAT.

7. The system of claim 6, wherein the inspection control unit is configured to output an alert to a user interface in response to detection of the existence of the one or more anomalies.

8. The system of claim 7, wherein the alert comprises one or both of an image or description of the one or more anomalies.

9. The system of claim 1, wherein the EMAT is coupled to the additive manufacturing head.

10. The system of claim 1, wherein the EMAT is separated from the additive manufacturing head.

11. The system of claim 1, wherein the additive manufacturing head is moveably coupled to a first support member, and wherein the EMAT is moveably coupled to a second support member.

12. The system of claim 1, wherein the EMAT is attached to the additive manufacturing head.

13. A method for inspecting an additively manufactured component, the method comprising:
    forming, by an additive manufacturing head, a component layer-by-layer, wherein the forming comprises moving the additive manufacturing head; and
    inspecting, by an electromagnetic acoustic transducer (EMAT), one or more layers of the component, wherein the inspecting comprises:
        following behind the additive manufacturing head, by the EMAT, as the additive manufacturing head forms the component layer-by-layer; and
        inspecting the component, by the EMAT, during the following.

14. The method of claim 13, wherein said forming comprises forming the component in a chamber of a container.

15. The method of claim 14, further comprising:
    disposing one or both of the additive manufacturing head or the EMAT within the chamber.

16. The method of claim 13, wherein said inspecting occurs during said forming.

17. The method of claim 13, further comprising:
    generating, by the EMAT, inspection data regarding the one or more layers;
    analyzing, by an inspection control unit in communication with the EMAT, the inspection data regarding the one or more layers; and
    determining, through said analyzing, existence of one or more anomalies within or between the one or more layers.

18. The method of claim 17, further comprising outputting, by the inspection control unit, an alert to a user interface in response to detection of the existence of the one or more anomalies.

19. A method for inspecting an additively manufactured component, the method comprising:
  disposing one or both of an additive manufacturing head or an electromagnetic acoustic transducer (EMAT) within a chamber of a container;
  moving both the additive manufacturing head and the EMAT relative to the chamber;
  forming, by the additive manufacturing head, a component layer-by-layer within the chamber;
  inspecting, by an electromagnetic acoustic transducer (EMAT), during said forming one or more layers of the component;
  generating, by the EMAT, inspection data regarding the one or more layers;
  analyzing, by an inspection control unit in communication with the EMAT, the inspection data regarding the one or more layers;
  determining, through said analyzing, existence of one or more anomalies within or between the one or more layers; and
  outputting, by the inspection control unit, an alert to a user interface in response to detection of the existence of the one or more anomalies.

20. The method of claim 19, wherein the forming comprises moving the additive manufacturing head, and wherein the inspecting comprises:
  following behind the additive manufacturing head, by the EMAT, as the additive manufacturing head forms the component layer-by-layer; and
  inspecting the component, by the EMAT, during the following.

* * * * *